D. B. WOODRUFF.
CANOE TRAILER FOR MOTOR VEHICLES.
APPLICATION FILED JUNE 5, 1920.
1,376,496.  Patented May 3, 1921.
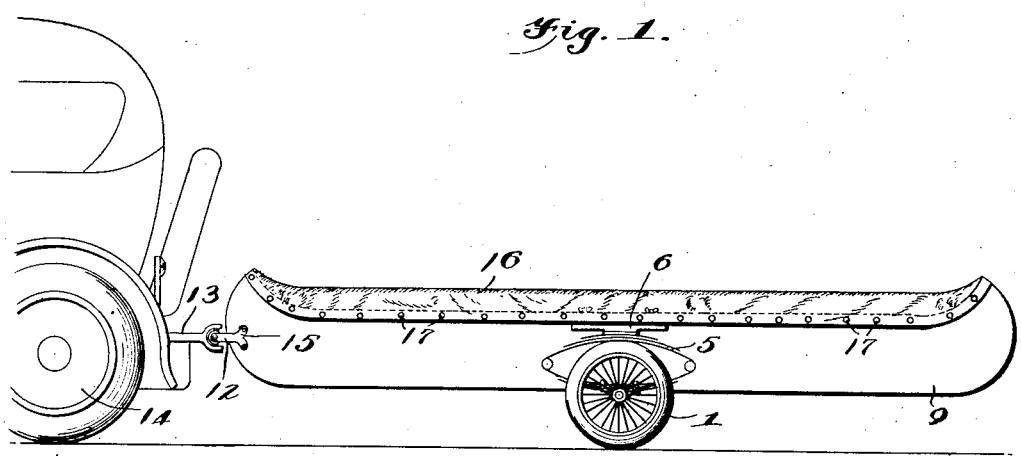
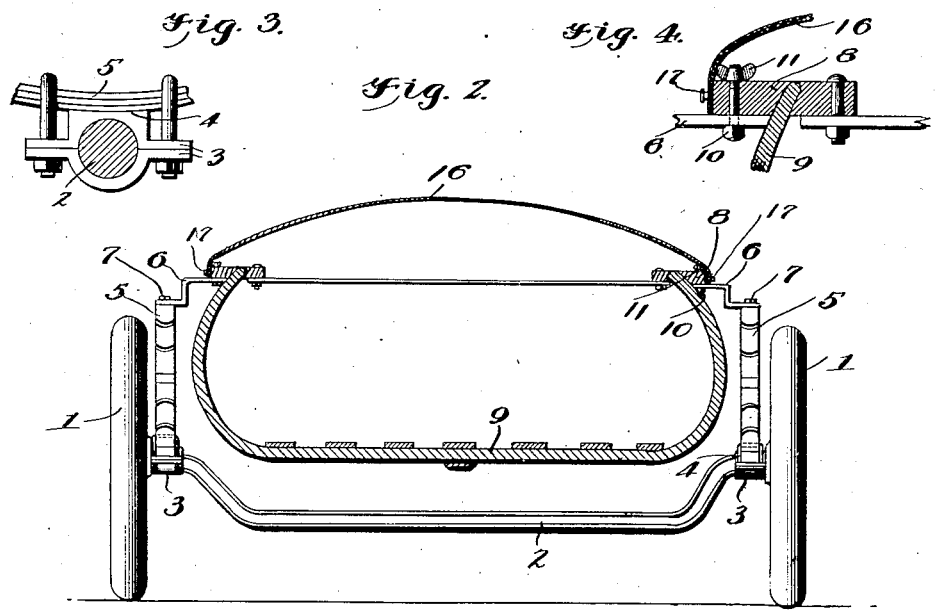
WITNESSES
INVENTOR
D. B. Woodruff,
BY
ATTORNEYS

UNITED STATES PATENT OFFICE.

DWIGHT BRYCE WOODRUFF, OF OLATHE, COLORADO.

CANOE-TRAILER FOR MOTOR-VEHICLES.

1,376,496.   Specification of Letters Patent.   Patented May 3, 1921.

Application filed June 5, 1920. Serial No. 386,800.

*To all whom it may concern:*

Be it known that I, DWIGHT BRYCE WOODRUFF, a citizen of the United States, and a resident of Olathe, in the county of Montrose and State of Colorado, have invented certain new and useful Improvements in Canoe-Trailers for Motor-Vehicles, of which the following is a specification.

My invention is an improvement in canoe trailers for motor vehicles, and has for its object to provide mechanism of the character specified by means of which a canoe may be converted into a wheeled vehicle of the trailer type and connected to the rear of a motor vehicle to be drawn thereby.

In the drawings:

Figure 1 is a side view of the improved trailer;

Fig. 2 is a transverse vertical section at the wheels;

Fig. 3 is a detail view of the clamp and saddle for mounting the spring on the axle;

Fig. 4 is a fragmentary detail view of the connection of the yoke to the gunwale.

In the present embodiment of the invention a pair of wheels 1 is provided, arranged in the present instance on the ends of an axle 2, the said axle being an arched or sprung axle, as shown, that is, having the spindles offset upwardly from the body of the axle. The axle carries near each end a clamp 3, which clamps are securely fixed to the axle, and a saddle 4 is provided in connection with each clamp, each saddle being engaged by an elliptical spring 5. The springs are arranged with their planes in vertical position, and at the top of each spring there is a combined yoke and clamp 6.

Each of these combined yokes and clamps 6 consists of a body which is fastened to the center of the top member of the elliptical spring by means of a bolt 7, as shown, and the arms of the yoke engage beneath the gunwale 8 of the canoe, indicated at 9.

Each arm of the yoke is connected to the gunwale by means of a bolt 10 which passes through the yoke arm and through the gunwale and is engaged by a wing nut 11 above the gunwale. The yokes 6 are arranged at the center of the canoe, and are in line transversely of the canoe, so that the canoe is supported by the wheels in balanced position.

When the canoe is connected up as a trailer, as shown in Fig. 1, a connection is provided in the form of a universal joint, one member 12 of which is connected to the canoe, while the other member 13 is connected to the vehicle 14 which is to drag the trailer. The member 12 of the universal joint has branches 15 which fit on opposite sides of the bow of the canoe, and these branches are secured to the canoe through the bang plate and knee. The universal joint permits upward movement of the ends of the canoe with respect to the motor vehicle and also permits lateral movement, it being understood that the member 13 is a rigid member.

The canoe may be loaded with camp equippage and the like and connected to the vehicle, and a water-tight and dust-proof cover 16 is preferably arranged over the canoe, the cover being secured to the canoe in any suitable manner, as, for instance, by the fasteners indicated at 17. The wheels 1 have pneumatic tires, as shown, and the cushioning action of the tires, together with that of the springs 5, eliminates all injurious shocks and jars.

Any canoe may be converted into a trailer merely by adding the connection 12 and connecting the wheels.

I claim:

In a device of the character described, means for converting a canoe into a trailer comprising an axle, a pair of wheels carried by said axle, a pair of springs arranged upon said axle, means for securing each of said springs upon the axle including a clamp engaged with the spring and the axle and having a saddle upon which the spring is seated, means coacting with said springs for supporting the canoe, including arms secured to the springs and offset inwardly, and means for connecting the arms to the gunwale of the canoe including bolts passing through the arms and through the gunwale and winged nuts threaded upon the bolts.

DWIGHT BRYCE WOODRUFF.